(12) United States Patent
Hardesty

(10) Patent No.: US 6,592,030 B1
(45) Date of Patent: *Jul. 15, 2003

(54) FINANCIAL TRANSACTION SYSTEM WITH RETIREMENT SAVING BENEFIT

(75) Inventor: Laurence D. Hardesty, Buckeye, AZ (US)

(73) Assignee: Pluris Savings Network, LLC, Phoenix, AZ (US)

( * ) Notice: Subject to any disclaimer, the term of this patent is extended or adjusted under 35 U.S.C. 154(b) by 184 days.

This patent is subject to a terminal disclaimer.

(21) Appl. No.: 09/619,806

(22) Filed: Jul. 20, 2000

Related U.S. Application Data

(63) Continuation-in-part of application No. 09/118,438, filed on Jul. 17, 1998, now Pat. No. 6,105,865.

(51) Int. Cl.[7] .................................................. G06K 5/00
(52) U.S. Cl. ........................................ 235/380; 705/35
(58) Field of Search ................................. 235/383, 380, 235/361, 379, 382, 375; 705/35

(56) References Cited

U.S. PATENT DOCUMENTS

RE36,116 E 2/1999 McCarthy 6,105,865 A * 8/2000 Hardesty .................... 235/380

OTHER PUBLICATIONS

Start. "Start Today To Set Your Savings In Motion" No Date.
Start. "Take A Vacation, Call A Friend, Lease A A Car, Buy A Gift . . . And Save . . Time" No Date.
Start. "Saving More For Your Future" No Date.
Start. Correspondence dated Jun. 5, 1991.
Start. Article—Author Conlin, Elizabeth No Date.

* cited by examiner

Primary Examiner—Karl D. Frech
(74) Attorney, Agent, or Firm—Gregory J. Nelson

(57) ABSTRACT

The system is a rebate program for the benefit of participating individuals such as wage earners. Participating individuals apply and are approved and are issued a card with an identifiable account number using credit approval systems. The card may include debit, smart card, customer loyalty and security features. The rebate is calculated and transferred to the participant's account in a trust fund. The card may also be used to engage in other financial transactions. The system may include a wide range of retail merchants as well as professional services available to the participant. Funds are disbursed to the participant upon the occurrence of certain specified events.

19 Claims, 2 Drawing Sheets

FINANCIAL TRANSACTION SYSTEM WITH RETIREMENT SAVING BENEFIT

The present application is a continuation-in-part of application Ser. No. 09/118,438, now U.S. Pat. No. 6,105,865.

FIELD OF THE INVENTION

The present invention relates to a financial system and more particularly relates to a financial processing system and method for directing a portion of a credit or other consumer transaction to a managed retirement or savings account of the participant. The system is of particular benefit to the wage earner who may not have adequately provided for retirement.

BACKGROUND OF THE INVENTION

The current banking system is moving toward cashless devices for both consumer and commercial transactions. The most common of cashless devices is the credit card or "plastic" as it is commonly called. Credit cards are issued by banks and other organizations and trillions of dollars are charged on credit cards each year in the United States. Generally, the conventional credit card is issued by companies such as VISA, MASTERCARD, AMERICAN EXPRESS and the like which establish a network of participating merchants that accept the cards. Banks and other institutions service the accounts. The consumer can then charge goods and services at participating merchants and the participating merchants pay a percentage of the transaction, usually several percent, to the credit card company. In order to promote use of a particular credit card and to induce merchants to participate, credit card issuers rely on various marketing techniques. For example, some credit card companies offer special discounts to users of cards if they participate by buying particular products or services. Other card issuers such as DISCOVER card rebate a small percentage to the consumer, again typically in the order of several percent. Other types of promotional devices include credits based on credit card activity which may be used when purchasing large ticket items such as vehicles.

In addition to the conventional credit card, other types of cards are used in commercial transactions. More and more, cards known as shopper loyalty cards and frequent shopper cards, are issued to customers by businesses such as grocery chains. These businesses promote use of these cards as a convenient alternative to paper coupons. The object of use of such cards, similar to the frequent flyer programs run by airlines, is to build loyalty by offering customers discounts. The customer presents the card to the merchant at the time of purchase and the card is scanned and certain items are then discounted. The advantage to the merchant is that such cards utilize a database eliminating the need for checkout cashiers to visually and electronically scan coupons. As mentioned above, such cards also build customer loyalty and also serve to obtain information on shoppers' buying habits and demographics, therefore providing the grocery store valuable demographic and product information which will assist in its marketing of products.

Other types of cards are known as SMART cards or e-cards. These cards are an alternative to the use of hard currency and basically a SMART card stores funds digitally. SMART cards of the type produced by Productivity Enhancement Products of Laguna Hills, Calif. work like an automated teller. These cards are personalized and protected by an identification system, typically a PIN number or a photo. The cards function like cash with their value stored on a computer chip embedded on the card which stored value is reduced by the amount of the purchase at the time of use. Merchants may then use PC based cash registers to deduct payments from the cards. SMART cards can be used to buy items and cards of this type are commonly used by students for purchasing meals at university cafeterias and are promoted for use in making telephone calls.

Other types of financial cards commonly used are debit cards which are presented to a cashier and the card is electronically "swiped". The user may then authorize a direct deduction from a checking account in the amount of the purchase or an amount which includes additional cash back to the user.

While many consumers actively use such cards, these same consumers are greatly concerned about the stability of the Social Security system and their own retirement. Studies show that the average worker has not adequately provided for his or her retirement. Further, the social security system is experiencing increasing financial problems. According to the trustees, the United States social security system will be insolvent by the year 2029. Currently Social Security taxes generate more revenue than the system pays out in benefits. The surplus theoretically accumulates in the social security trust fund. However, it is estimated that in the year 2012 the situation will reverse and the Social Security system will be obligated to pay out more in benefits than it collects in revenues. To continue to meet its obligations, the system will have to begin drawing on the surplus in the trust fund. In actuality the trust fund surplus is a fiction as the federal government has used the trust fund for other purposes and has over the years "borrowed" money from the trust fund to disguise the actual amount of the federal budget deficit. Effectively, the federal government has been borrowing from the social security fund and issuing IOU's in the form of bonds to the Social Security fund. It is estimated that in 2012 the Social Security system will have to start turning in the bonds to the federal government to obtain cash needed to pay benefits, but the federal government has no cash or other asset and, therefore, the deficit will accelerate.

Even if the financial difficulties of the present Social Security system can be fixed, the system is not a sound investment for most Americans who contribute and is even worse for younger workers. Payroll taxes are high and even if today's younger workers receive the promised benefits, those benefits will amount to a below-market return on their taxes. Today's retirees generally get back all they have paid in to Social Security, plus a modest return, but when younger workers retire they will actually receive a negative rate of return which will be lower than the amount of contributions.

Based on these problems, there are various reforms that have been proposed one of which is the privatization of the Social Security fund.

Unlike private pensions and individual retirement accounts, the Social Security system does not invest the money it collects in stocks and bonds but pays those funds out as benefits the same year they are collected.

Accordingly, because of the deteriorating financial condition of the Social Security system, it becomes more and more incumbent upon individuals to plan for their own retirement to ensure a secure future. The present system is based on the underlying concept that merchants and credit card issuers would be willing as an inducement to pay a percentage of the transaction as a refund into a tax deferred fund for the benefit of the card holder.

Various rebate and refund systems can be found both in the prior art and patent literature. For example, U.S. Pat. No.

4,750,119 describes a purchasing system with a rebate feature which allows for the input of purchase orders and correlates transfer of funds from purchasers to vendors. A future benefit guarantor supplies the rebate factor which is input into the system. The system then computes and reports the rebate which is due in the future to each subscriber or purchaser. The system provides instructions to pay the vendors for selected goods and services and pay the future rebate guarantor a premium representing the purchase price of future guaranteed rebates. Preferably the premium is paid on a daily basis to the guarantor and a group annuity contract is funded.

U.S. Pat. No. 4,941,090 shows a centralized computer cash value accumulation system based on point of sale transactions with multiple merchants. The consumer's account number and birth date are transmitted to a central system along with data identifying the merchant and a credit line determined by the merchant. At the central location, a cash value for that consumer is incremented by the credit value and a bill for that merchant is similarly incremented. Periodically the merchants are billed for the accumulated bill value. Also at selected intervals, consumers are given access to their respective accumulated cash values by either check or through funds dispensed electronically. Preferably the intervals are selected to correspond to the birth dates of the consumers.

U.S. Pat. No. 5,537,314 shows a credit accumulation and accessing system for a plurality of sponsors and participants. Under the control of an operational program, several tasks are accomplished including creating sub-directories for a single participant account so as to selectively associate the single account sub-directory with multiple sponsoring company accounts in deciphering and, accordingly at points of sale, calculating, posting and issuing discounts, raffle entries, store credit returns, points and cash values in accordance with the performance of participants. Award output devices provide consumers access to funds based upon the cash value in the consumer account and may include wire transfer, check, cash coupon, charge card balance reduction or catalog merchandise.

BRIEF SUMMARY OF THE INVENTION

Accordingly, the present invention provides a processing system based on a retirement card for financial transactions which with some modification will utilize the existing financial structure and existing computer software and hardware so that over a period of time, a portion of funds spent by users utilizing the retirement card will be deposited into a depository such as a trust fund. Funds so deposited over the working life time of an individual will be allowed to accumulate and can only be withdrawn upon retirement or some other event such as medical emergency and either on a tax-free or tax deferred basis.

The present invention provides a system in which an individual is issued a special credit type card which is designated a "Retirement Charge Card" (RCC). The user would have an identifiable account in a trust fund and the RCC would be issued by banks or other existing financial institutions. Individuals, upon consummating transactions such as credit purchases using the card, would be rewarded with a rebate in a predetermined about, which rebate would not go directly to the individual card holder but rather would be deposited into the card holder's trust fund account. The invention contemplates using existing electronic credit and banking systems for approval both approving the issuance of cards and approving individual transactions.

The result would be that those using the cards would tend to be financially responsible individuals and therefore the rate of delinquency or loss on the cards to card issuers and businesses would be substantially reduced. Use of the cards would benefit businesses in that card holders would tend to make more purchases on their cards, thus increasing the revenue to the businesses and banks. The system may be implemented without additional legislation using existing technology, electronic communication and data processing systems.

As an additional feature, those businesses honoring the retirement cards could also be provided with conventional banking software and have one or more checkout locations at which the software is available creating a virtual banking system which would substantially reduce transaction costs to banking institutions. Thus, card holders could utilize these checkout locations when purchasing goods or services. Further, these locations could provide other banking services such as deposits, bill payment and the like, thus providing convenience to card holders and providing more convenient banking locations and reducing overhead and operating expenses to banks.

The retirement trust fund would issue periodic statements to the card holders setting forth the amount in the trust. The funds would be treated as trust funds and deposited in investments such as government securities, bonds, and perhaps blue chip stocks. As another aspect of the system, the individual retirement card holder could select from a menu of securities such as high growth stocks, bonds, government securities or blue chip stocks and select the particular areas in which the funds deposited to the card holder's account would be invested.

Another significant advantage of the transaction system of the present invention is that the system inherently provides a safeguard for as inflation occurs over a period of time and as the card holder spends more, increased retirement savings will be effected as the rebate is based on a percentage of the amount spent.

The system further contemplates expanding services available to participants by providing additional services such as low cost loans, appraisal services, insurance services, provided by entities funded by the trust fund. Stock in these companies would be available to member participants.

BRIEF DESCRIPTION OF THE DRAWINGS

The above and additional features and advantages will become more readily apparent from the following detailed description of the invention taken in conjunction with the drawings in which:

Referring now to FIG. 1, there is shown a financial processing system 10 in which a predetermined percent of expenditures are rebated to the consumer in the form of deposits into a retirement trust account. The portion of the transaction which is credited to the member is termed a "rebate" which implies that ownership of this amount is transferred to a financial institution and then credited back to the member. The term "rebate" also includes amounts which are considered to remain the members and which are passed through the system for the member's benefits. The system is generally designated by the numeral 10 and each member or participant 12 is designated as a retirement card holder which for purposes of this disclosure is designated as "RCH". Each RCH applies for and upon approval would be issued an RCH card 14 as best seen in FIG. 2. Existing credit reporting agencies such as Equifax and TRW can be utilized for approval of applicants. The RCH card 14 would be issued by a bank or other organization 18. The applicant provides the usual information which is processed by a credit approval computer 22 which checks credit records and which using prescribed standards approves the applicant as an RCC.

Figure 2:
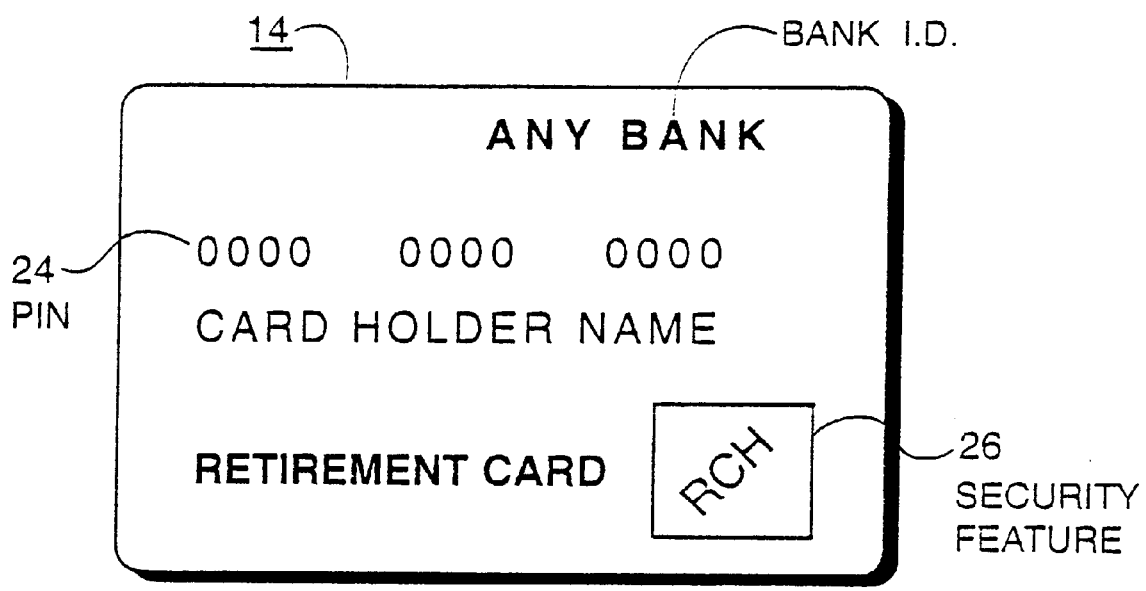
FIG. 2 shows a typical retirement card.

Upon approval of an RCH card as shown in FIG. 2 would carry an identifiable account number 24 which would be personal to the card holder. The account number may correspond to the user's social security number of the RCH card holder or may be some other PIN. The card has characteristics of a credit card with a predetermined spending limit issued by a bank or other organization as is conventional or could also be a SMART card which the RCH would purchase and would electronically store funds up to a certain amount. A SMART card would include a verification number and a de-encryption algorithm for security. Security can also be provided by other verification techniques such as biometrics. Security features 26 such as photograph, thumb print or some other security feature such as a microchip may be included to ensure that only the authorized RCH may utilize the card. The card may include other features such as debit features to allow the card holder to debit selected accounts upon the purchase of goods or services. The RCH card will also authorize the RCC to access various accounts and perform various transactions.

Benefits also accrue to merchants as participating merchants would advertise that they accept the retirement card which would enhance the business and attract additional business and customers. Participating merchants 30, 32 may be conventional retail merchants such as supermarkets, department stores, restaurants and the like or even professionals such as lawyers, doctors and accountants. In addition, participating merchants could also be less traditional such as casinos where the card holder could purchase casino credits in a predetermined amount. Thus, those that participate by accepting the card could experience increased business by appealing to a broader segment of the consuming society. Users will tend to place more expenditures on the card since they will, by doing so, add to their retirement funds.

For example, the card holder could use the retirement card at a retail location such as a department store represented by the numeral 32. By using the card, the card holder may charge the purchase. The merchant will process the purchase using a PC based processing system on a centralized computer 40 and obtain authorization using either existing charge authorization or a similar system established for the RCH system. The user can charge goods and services offered by those accepting the RCH. At the end of a business cycle, for example at the end of the day, the merchant will then make a deposit, either physically or electronically, with the merchant's bank 18 including those credit sales which were purchased by customers using the retirement card. The bank 18 will credit the merchant's account 52 with an amount which represents the amount of the sale less certain costs of the transaction including any fees that the merchant has agreed to pay the underwriting or card-issuing organization such as VISA, MASTERCHARGE or DISCOVERY card. The calculation of the rebate and transfer of funds occur electronically using existing banking systems or systems using electronic transfer established for this purpose. In addition, the bank 18 will transfer a predetermined percentage of the transaction to a retirement trust account 100. The predetermined percentage, termed a rebate 60, is calculated by an established formula based on the transaction and typically would be between 2 and 5 percent.

The retirement trust account 100 is a professionally managed find and amounts that are transferred will be credited to the card holder's retirement account using the card holder's account designation such as the PIN 24 assigned to the particular card holder. Periodically, the card holder will receive a statement from the issuing bank reflecting charges for a billing cycle as, for example, over a thirty day period. The card holder will then pay the amount billed or at least a minimum monthly fee to the bank.

The advantages of the system 10 are many. The system is driven to some extent by the individual card holder's desire to be able to make purchases conveniently using the card 14 and also by the card holder's concern for a more secure financial future. Businesses will benefit as the system will generate a larger customer base and increased sales. As pointed out above, there is a built-in hedge against inflation as credits or rebates are based on a percentage of sales amounts. Losses would be low as those individuals who would be issued cards would tend to be financially responsible individuals of the type that are concerned about their financial future. Transaction costs could be minimized since losses and delinquencies will inherently be lower. In addition, costs of the system could be offset by advertising income that would accompany statements sent to the card holders. For example, special discounts on promotions of goods and services offered by vendors 90 of such goods and services could accompany periodic statements issued to the card holder. Goods and services can also be promoted through value card-type promotions which would also serve to increase customer loyalty and result in savings to customers who purchase specially promoted goods and services. These vendor promotions can be available directly to the participant at the time of check-out in the form of discounts on selected items.

The card holder is preferably provided a menu from which the card holder could select the type of investments to be made with the card holder's funds on deposit in the trust fund 100. These funds would be professionally managed and would broadly be categorized as a high, medium or low yield investment or a mixture of such investments depending upon the objectives and personal preference of the individual card holder. Lower yield investments would traditionally be a bit more secure and would be such items as government securities. Medium yield investments would be quality corporate bonds whereas the high yield investment would generally be made in stocks such as blue chip stocks or perhaps mid-cap stocks. The result is privatization of retirement funding. Significant advantages would be that the system would relieve the pressure from the faulty social security system and, at the same time, increase benefits to participants.

Studies have shown that workers born in 1950, using rates of return on stocks and bonds that are lower than actual returns, a low income worker can expect $631 per month from social security. Had that worker instead invested his payroll tax in a 50—50 mix of government and corporate bonds, his monthly retirement income would have been $1,069 per month. Had this worker invested in a stock portfolio of 75% large capitalization companies and 25% small cap companies, he would receive a monthly income of $2,419 per month.

Figure 1:
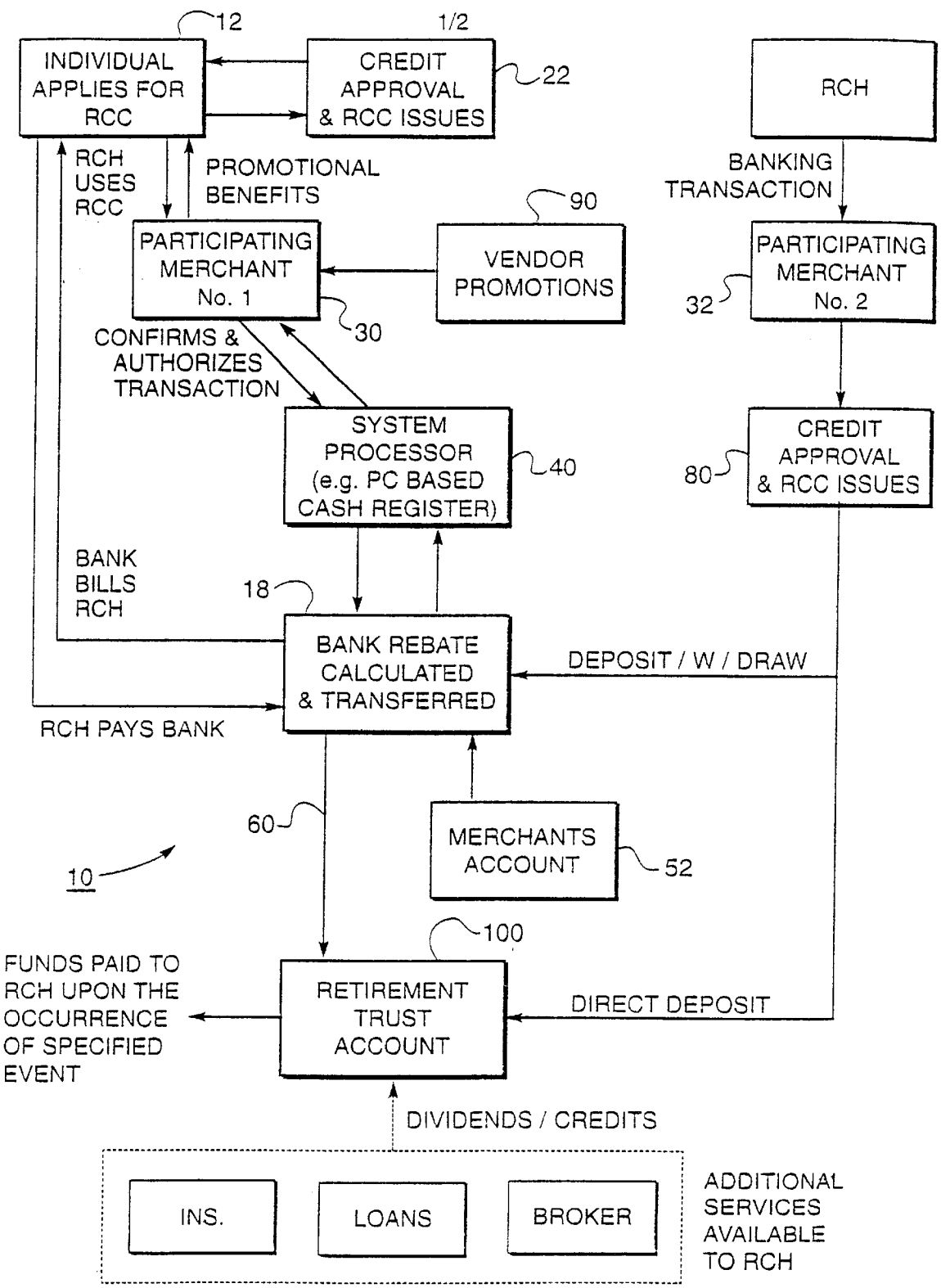
FIG. 1 is a schematic diagram depicting the basic system of the present invention.

The participating businesses, in order to attract more customers and also to reduce the transaction costs and to provide convenience to the customers, may offer a number of other services as indicated in FIG. 1. Instead of simply serving as a provider of goods and services established retail businesses such as department stores, supermarkets and other merchants could also provide a large range of banking services. As indicated above, a participating merchant such as a supermarket represented by the numeral 32 may provide special checkout aisles for individuals participating in RTA accounts 100. There the customer may by use of the card 14 to purchase items. In addition, since the account is a specifically identifiable account, the merchant may install conventionally available banking software 80 to allow the RCH to make deposits into banking or checking accounts, cash checks, transfer funds between accounts and perhaps make payments for such items as utilities and installment payments.

Thus, each user or subscriber of the system may participate in various investments and can utilize the card for convenient access to other banking services. The card can be used not only for purchases of goods and more conventional services but can also be used to purchase professional services such as services of accountants, lawyers, doctors, dentists and the like. Individuals may also use the card for making donations to designated beneficiaries such as charities.

The funds in the participant's account 100 would be distributed upon the occurrence of a specific event such as the individual reaching a specified age and preferably tax laws will allow the distribution to be either tax deferred or tax free. Implementing regulations may also provide for early distribution if a specified need arises such as a medical or educational expense.

EXAMPLE

The following are examples of the benefits to a participating member who spends $25,000 per year using the card 14 for an average of twenty-five years based on a 5% rebate:

@6% the trust account would be worth $72,189.18
@7% the trust account would be worth $84,385.17
@8% the trust account would be worth $99,068.42

The annual spending figures of $25,000 is not excessive as average income users spend this amount annually on food, utilities, clothing, insurance, transportation, travel, entertainment and housing. Since a significant benefit occurs, users would simply have to discipline themselves to use the card and pay off balances monthly.

The system can also be expanded as shown in FIG. 1 to provide the participating members other services. The trust fund will accumulate a huge sum of money which will be administered by a board of trustees. Some funds may be used to establish businesses such as banks, brokerage houses, insurance companies, appraisal firms, accounting firms which may be utilized by RCH's at substantial savings. Profits from these businesses could thus be returned to the member who utilized these services in the form of dividends or additional credits to the member's trust fund account based on participation. The business can be corporations in which the members may buy stock or may be established as cooperative ventures depending on existing laws and regulations. It may be that special enabling legislation may be required to establish certain features of the system.

The issuance of cards is not restricted to nationals, thus, use of the card by non-residents would result in funds flowing into the country which would have a favorable effect on the balance of trade.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A financial transaction saving system utilized by a plurality of participants and participating suppliers of goods and services, said system comprising:

(a) means for assigning identification indicia to each participant;

(b) account means for establishing an account for the benefit of a participant such that the account is an investment account;

(c) rebate calculating means for acquiring information regarding a purchase from participating suppliers including purchase amounts such that a rebate may be calculated;

(d) transferring means for transferring a rebate amount to the investment account; and (e) distribution means for distributing at least a portion of said account upon the occurrence of an event.

2. The financial transaction system of claim 1 wherein said purchase is made by a SmartCard which stores information concerning the account.

3. The financial transaction system of claim 2 wherein the SmartCard includes security features.

4. The financial transaction system of claim 2 wherein said purchase is made by credit card.

5. The financial transaction system of claim 2 wherein said purchase is paid by electronic transfer.

6. The financial transaction system of claim 2 wherein said purchase is made by a debit card.

7. The financial transaction system of claim 2 wherein said purchase is made by cash.

8. The financial transaction system of claim 1 wherein the said investment account is combined with the investment account of other participants to form a combined investment account.

9. The financial transaction system of claim 8 wherein said combined account generates revenue utilized to fund entities and equity in said entities is available to the participants.

10. The financial transaction system of claim 1 wherein said rebate calculating means comprises a computer in communication with processing means at the participating supplier location.

11. The financial transaction system of claim 1 wherein participating suppliers provide financial services to participants.

12. The financial transaction system of claim 1 wherein said participant may select the type investments in the investment account.

13. The financial transaction system of claim 1 wherein said rebate calculating means comprise a computer.

14. The financial transaction system of claim 1 wherein said participants are provided periodic statements of account.

15. A financial transaction saving system utilized by a plurality of participants and participating suppliers of goods and services, said system comprising:

(a) means for assigning identification indicia to each participant wherein the indicia is the number of an existing card issued by a financial institution;

(b) account means for establishing an account for the benefit of a participant such that the account is an investment account;
(c) rebate calculating means for acquiring information regarding a purchase from participating suppliers including purchase amounts such that a rebate may be calculated;
(d) transferring means for transferring a rebate amount to the investment account; and
(e) distribution means for distributing at least a portion of said account upon the occurrence of an event.

16. The financial transaction system of claim 15 wherein said purchase is made by credit card.

17. The financial transaction system of claim 15 wherein said purchase is paid by electronic transfer.

18. The financial transaction system of claim 15 wherein said purchase is made by a debit card.

19. The financial transaction system of claim 15 wherein said purchase is made by a SmartCard which stores information concerning the account.

* * * * *